Nov. 14, 1967  TOORU SAIMA  3,352,256
STABILIZING RAILWAY TRUCK
Filed March 13, 1964  4 Sheets-Sheet 1
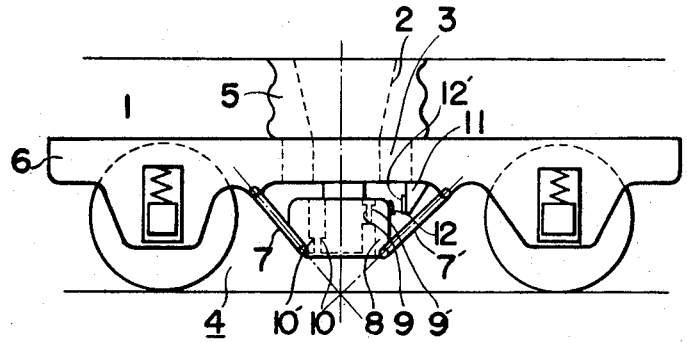
FIG.1
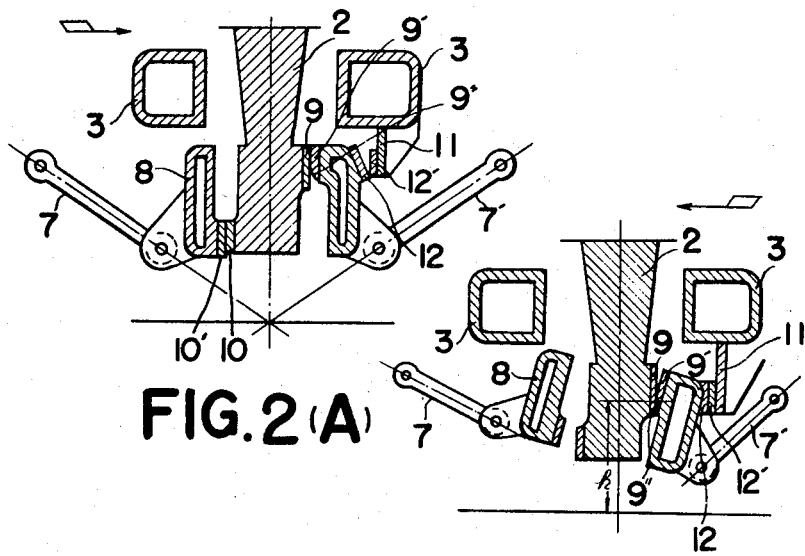
FIG.2(A)
FIG.2(B)
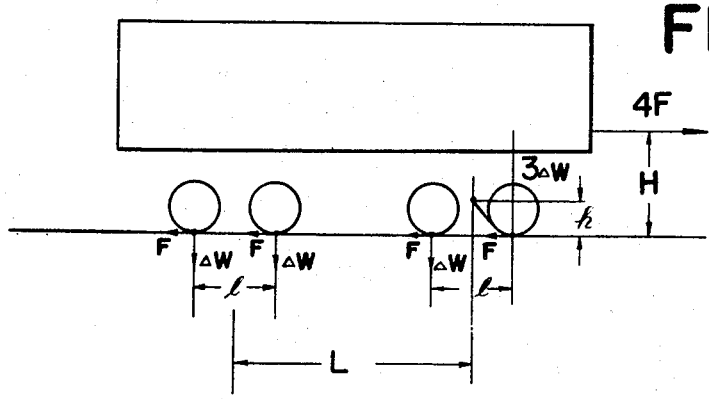
FIG.3
Tooru Saima
INVENTOR.
BY George B. Auyesh
Attorney

United States Patent Office 3,352,256
Patented Nov. 14, 1967

3,352,256
STABILIZING RAILWAY TRUCK
Tooru Saima, Meguro-ku, Tokyo, Japan, assignor to Tokyo Shibaura Electric Co., Ltd., Kawasaki-shi, Japan, a corporation of Japan
Filed Mar. 13, 1964, Ser. No. 351,727
Claims priority, application Japan, Mar. 19, 1963, 38/12,809, 38/12,815
3 Claims. (Cl. 105—199)

This invention relates to a novel stabilizing railway truck which acts as a truck having means to prevent shift of axle weight or load when it is travelling in one direction but acts as a truck having low bolster when travelling in the opposite direction.

During starting or acceleration of a railway vehicle, more particularly an electric locomotive, the tractive force generated by electric motors is transmitted from trucks to the main car body of the locomotive. In such a case the weights or loads acting upon each axle of the locomotive will not be equal due to shift of axle weights. Generally the weight acting upon the foremost axle is smallest and the axle weight gradually increases towards the trailing end of the locomotive. Decrease in the axle weight results in the decrease in the effective utilization of the motor torque as the tractive force and hence wheels with light loads tend to slip. Accordingly it has been proposed to provide a truck having means to prevent shift of axle weight during starting or acceleration, said means comprising a mechanism to locate the effective point of application of the surface of the rail upon which the locomotive is running and transmit the tractive force to the car body upon which the locomotive is running. However, in some cases increase in the axle load is rather desirable for the locomotive itself provided that the load is within a range durable by the rail. Accordingly in a so-called B+B type locomotives employing two trucks, each having two axles, it has become desirable to operate the leading truck (as viewed in the direction of travelling) as a truck having means to prevent shift of axle weight while operating the trailing truck as a low bolster truck. As electric locomotives are usually double ended, it is required to construct each of the two trucks so that they can operate in either of said modes depending upon the direction of travelling.

It is therefore an object of this invention to provide an improved railway truck which can operate either as a truck having means to prevent shift of axle weight or a truck having a bolster at low level depending upon the direction of travelling.

This invention can be practiced by providing a railway truck comprising a truck frame adapted to support a car body, a bolster pin depending downwardly from said car body through said truck frame and a traction beam pivotally supported by said truck frame to cooperate with said bolster pin in tractive force transmitting relation, said traction beam and said bolster pin being constructed to cooperate such that when the truck is travelling in one direction the effective point of transmitting the tractive force between them is substantially on the surface of rails upon which said truck is running whereas when said truck is travelling in the opposite direction, said point is shifted to a point which is located at a higher level than the surface of said rails.

According to one embodiment of this invention the traction beam is pivotally suspended from the truck frame through a pair of converging links which are disposed at such angles that the center lines thereof normally cross each other at a point included in the upper surface of the rail. In this condition wherein the intersection of center lines of a pair of converging links lies on the upper surface of the rail, the transmitting point of the tractive force between car body and truck is also at the upper surface of the rail. As a result, the tractive force generated between the wheel and the rail surface is transmitted at the rail surface to the car body and a moment of force which may cause shift of axle weight is not generated in the truck, so that the preventive effect against shift of axle weight is attained. The bolster pin is provided with abutting surfaces at its upper outer side and lower inner side to respectively cooperate with corresponding abutting surfaces provided for the wall of an opening of a traction beam which receives said bolster pin. When the truck is operating as a trailing truck the traction beam will tilt to cause upper abutting surfaces to engage each other whereby to shift the effective point of transmitting the tractive force away from the upper surface of the rail.

In another embodiment a spherical or cylindrical journal surface is provided on the upper surface of a traction beam which is pivotally suspended from the truck frame, and on the lower end of a bolster pin is provided a cooperating journal surface, one-half thereof having the same curvature as said spherical journal surface so that when the truck is operating as a leading truck the bolster pin and the tractive beam engage each other at these spherical journal surfaces thus effectively transmitting the tractive force at the center of curvature included in the upper surface of the rail. The other half of lower end of the journal pin comprises a horizontal surface which is tangential to said spherical journal surfaces so that when the truck is operating as a trailing truck the spherical surface of the traction beam will disengage the spherical surface of the bolster pin and come to engage the horizontal surface thereof. In order to transmit tractive force between the traction beam and the bolster pin in this condition, an abutting surface may be provided on the outside of said spherical section of the bolster pin to cooperate with a corresponding abutting surface properly secured to the truck frame. Alternatively, a curved surface having its center of curvature at a point located at a higher level than the surface of the rail may be provided at the outer end of said horizontal surface to cooperate with the spherical surface of the traction beam. In any case the effective point of transmitting the tractive force is shifted to a point at a higher level than the surface of the rail whereby the truck can operate as a low bolster truck.

Further objects and advantages of this invention will become apparent by reference to the following description and the accompanying drawings, and the features of novelty which characterize this invention will be pointed out with particularity in the claims annexed to and forming a part of this specification. In the drawings, FIG. 1 is a side elevation of a railway truck embodying this invention;

FIGS. 2(A) and 2(B) show enlarged cross-sectional views of a bolster pin and a traction beam of the truck shown in FIG. 1 in different operating conditions acting as a leading or trailing truck, respectively;

FIG. 3 shows a diagram of dynamic balance of forces of a B+B type locomotive (two trucks, four axles) employing two trucks constructed according to this invention;

Figure 5A:
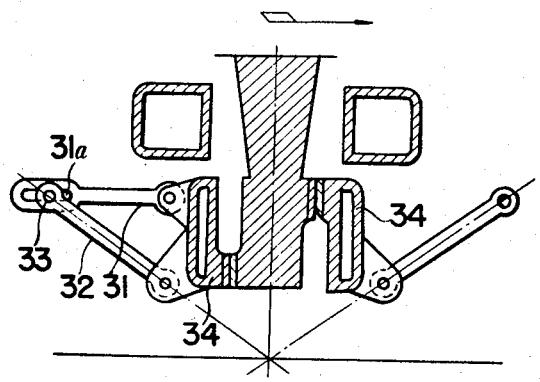
FIGS. 5(A) and 5(B) show enlarged cross-sectional views similar to FIGS. 2(A) and 2(B) of another embodiment of this invention acting as a leading or trailing truck, respectively.
Figure 5B:
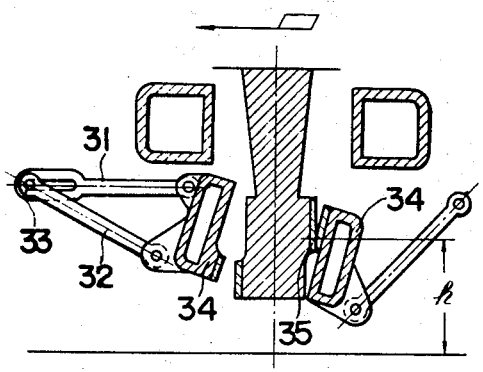
Figure 7A:
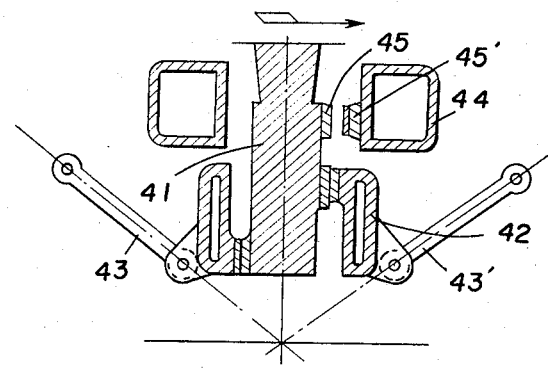
Figure 7B:
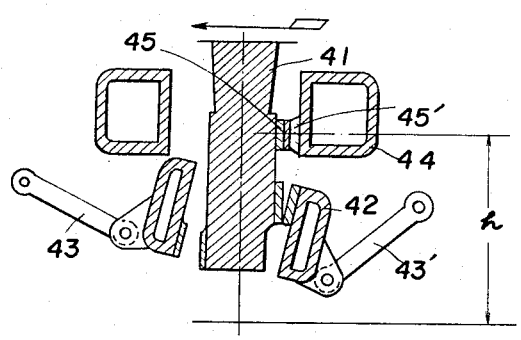
Figure 8:
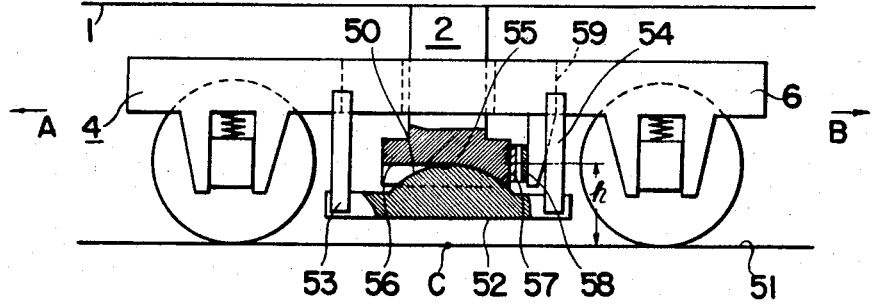
Figure 9:
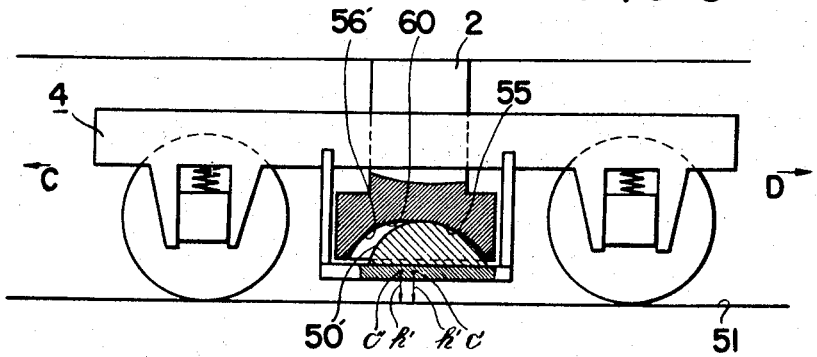

FIGS. 7(A) and 7(B) show further midifications similar to FIGS. 5(A) and 5(B), respectively;

FIG. 8 is a side elevational view, partly in section, of a truck having a bolster pin provided with a spherical surface mating with a spherical surface of traction beam as one embodiment of this invention;

FIG. 9 is still another embodiment similar to that shown in FIG. 8.

Referring now to the accompanying drawings, more particularly to FIGS. 1 and 2 there is shown one form of the novel truck 4 adapted to support a car body 1 of an electric locomotive, for example, through a suitable bolster spring, such as, a pneumatic spring 5. A bolster pin 2 depending from the lower portion of the car body 1 extends through a transverse beam 3 of the truck 4. As is the usual practice, the side frames 6 of the truck are supported on journal boxes through journal springs. Each end of a transverse traction beam 8 is suspended from the side frame 6 by a pair of converging links 7 and 7' and the lower end of the bolster pin 2 is received in an opening machined through the traction beam 8, as more fully described later. It is advantageous to use suitable ball joints between the ends of the links and the side frames and/or traction beam. According to this invention abutting surfaces are provided for the cooperating surfaces of the bolster pin 2 and the traction beam 8. More particularly, when it is assumed that the truck 4 is provided at the rear end of the car body 1, then the center of the car body will be to the right of the truck 4. In this embodiment abutting surfaces 9 and 9' are provided at the upper right side while the abutting surfaces 10 and 10' are provided at the lower left side of the cooperating surfaces of the bolster pin and the traction beam. As shown in FIGS. 2A and 2B the lower portion 9'' of the abutting surface 9' is bevelled while other abutting surfaces 9, 10 and 10' are parallel to the axis of the bolster pin 2. On the lower surface of the transverse beam 3 of the truck is provided a depending flange 11 having an abutting surface 12' cooperating with a bevelled abutting surface 12 provided on the outer upper side of the transverse beam 3, said abutting surface 12 being parallel to the abutting surface 9'''. In this embodiment the height $h$ of said abutting surfaces 9''', 12 and 12' above the surface of the rail is determined to satisfy the following equation $$h = \frac{2lH}{L+l}$$

where $L$ represents distance between bolsters, $l$ the distance between two axles belonging to one truck and $H$ the height above the rail surface of the coupler provided for the car body.

It will be understood that the truck is so designed that when the truck is operating as a leading truck, the abutting surfaces 9 and 10 on the bolster pin engage the abutting surfaces 9' and 10', and that the center lines of the links 7 and 7' cross each other on the upper surface of the rail, as shown in FIGS. 1 and 2A to effectively transmit the tractive force to the car body through said cross point, so that shift of axle load can be positively prevented.

It is now assumed that the truck is operating as a trailing truck. In this case, as shown in FIG. 2B, since the bevelled abutting surface 9'' on the depending flange 11 engages the abutting surface 9 on the bolster pin 2, the traction beam 8 will be rotated in the clockwise direction about an axis perpendicular to the axis of the bolster pin so that the point at which the center lines of the links 7 and 7' cross each other will be moved away from the upper surface of the rail. At this time as the bolster pin 2 and the traction beam 8 engage each other at abutting surfaces 9'' and 9 the tractive force will be transmitted through engaged abutting surfaces 9 and 9'', and 12 and 12' so that the condition required for preventing shift of axle weight is not satisfied. As mentioned above if it is designed that $$h = \frac{2lH}{L+l}$$

then it is possible to make equal the weights acting on the first, second and third axles of the locomotive counting from the foremost axle.

More particularly, referring to FIG. 3, if it is assumed that $F$ represents the tractive force per one axle, the amount of shift of axle weight $\Delta W_1$ in the leading truck (of course the amount of shift of axle load is the same for both axles) and the amount of shift $\Delta W_2$ of axle load in the trailing truck can be shown by the following equations.

$$\Delta W = \frac{2FH}{2L} + \frac{2F(H-h)}{2L} = \frac{F(2H-h)}{L}$$

$$\Delta W_2 = \frac{2FH}{l} - \frac{F(2H-h)}{L}$$

As mentioned above, in the truck of this invention it is required to make equal $\Delta W_1$ and $\Delta W_2$, or $$\Delta W_1 = \Delta W_2$$

Accordingly $$\frac{F(2H-h)}{L} = \frac{2FH}{l} - \frac{F(2H-h)}{L}$$

$$\frac{2F(2H-h)}{L} = \frac{2Fh}{l}$$

$$h = \frac{2lH}{L+l}$$

As can be noted from the foregoing description, irrespective to the direction of travelling of an electric locomotive equipped with novel trucks constructed according to this invention, the leading truck acts to prevent shift of axial weight whereas the trailing truck acts as a low bolster truck to minimize shift of axle weights among four axles.

Figure 4:
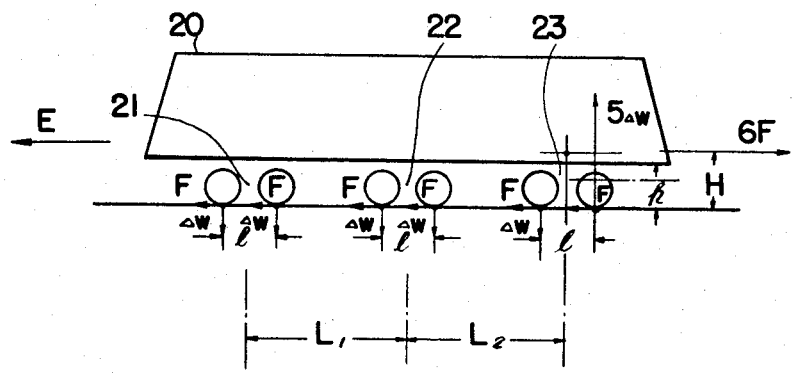
FIG. 4 shows a similar diagram of dynamic balance of forces of a B+B+B type locomotive (three trucks, six axles) employing three trucks of the invention.

While the above described embodiment is related to a B+B type locomotive, FIG. 4 shows a diagram of balance of forces of a B+B+B type locomotive utilizing the trucks of this invention. Like the B+B type locomotive, in the locomotive shown in FIG. 4, axle weights acting upon the first, second, third, fourth and fifth axles counting from the front end of the locomotive are made equal while the weight acting upon the sixth axle is increased by an amount equal to the sum of decrease in weight on the first to fifth axles. As schematically shown in FIG. 4, the body 20 of a locomotive is mounted upon three trucks 21, 22 and 23 each having two axles. The intermediate truck 22 is provided with any suitable means, for example, as hereinafter described for preventing shift of axle weight irrespective to the direction of travel of the locomotive and the trucks 21 and 23 at the opposite ends are constructed in accordance with this invention as shown in FIGS. 1 and 2(A), 2(B). When it is assumed that the locomotive is advancing in the direction indicated by an arrow E the leading and intermediate trucks 21 and 22 will act to prevent shift of axle weight and the trailing truck 23 will act as a low bolster truck. In a usual B+B+B type locomotive employing three trucks, even if the leading and intermediate trucks are equipped with means to prevent shift of axle weights, weights acting upon the respective axles of these trucks will be shifted. Therefore, it is necessary to provide suitable means to prevent shift of axle weights between the leading and intermediate trucks. This can be accomplished, for example, by mounting the body of the locomotive upon the respective trucks through pneumatic springs and by controlling the air pressure in the springs in response to shift of axle weights. By this means the axle weights upon the first to fifth axles are shifted by equal amount $\Delta W$ and the axle weight acting upon the sixth axle or the rear axle of the trailing truck is increased by $5\Delta W$.

If it is assumed that:

F: tractive force per axle,
H: height of the coupler,
$h$: height of the bolster pin of the trailing truck,
$\Delta W$: amount of decrease in axle weight,
$L_1$: distance between bolster axes of the leading and intermediate trucks,
$L_2$: distance between bolster axes of the intermediate and trailing trucks then the balances of moments around the center line of the trailing truck 23 and a line at a height H of the coupler can be expressed as follows:

$$4FH + 2F(H-h) = 2\Delta W(L_1+L_2) + 2\Delta W \times L_2$$
$$2F(3H-h) = 2\Delta W(L_1+2L_2)$$
$$F(3H-h) = \Delta W(L_1+2L_2) \quad (1)$$

The dynamic balance of forces of a locomotive as a whole is expressed as follows. Thus, the balance of moments around the rail surface to the rear of the trailing truck is expressed by an equation:

$$l\Delta W + L_2\Delta W + (L_2+l)\Delta W + (L_2+L_1)\Delta W + (L_2+L_1+l)\Delta W = 6FH$$
$$\Delta W(3l+4L_2+2L_1) = 6FH \quad (2)$$

By eliminating $\Delta W$ from Equations 1 and 2, we obtain $$F(3H-h) = \frac{6FH}{3l+4L_2+2L_1}(L_1+2L_2)$$
$$\therefore h = \frac{9Hl}{3l+4L_2+2L_1} \quad (3)$$

Thus, it is able to provide locomotives having minimum shift of axle weights among respective axles by selecting the height $h$ of the bolster pin of the trailing truck to satisfy the Equation 3.

It should be understood that the invention is by no means limited to a particular construction shown in FIGS. 1 and 2 but can be modified in various ways without departing from the true spirit and scope of the invention.

In the modification shown in FIGS. 5(A) and 5(B), a link 31, pivotally connected to the upper left side of a traction beam, is provided with an elongated slot 31a to slidably receive a pivot pin 33 which connects a suspending link 32 (corresponding to the link 7, FIG. 1) to the side frame (not shown) of a truck. As shown in FIG. 5A when the truck is travelling in the direction indicated by an arrow or when it is operating as the leading truck the pivot pin 33 will be at an intermediate point between the ends of the slot 31a so that the link 31 does not operate, and the truck will act to prevent shift of axle weight. On the other hand when the truck is operating as the trailing truck, as shown in FIG. 5B, the traction beam 34 will rotate in the clockwise direction, this rotation being limited by the engagement of the pin 33 and left hand end of the slot 31a. This rotation will also move the point of crossing between the center lines of the suspending links away from the surface of the rail so that the tractive force will be transmitted through the abutting surface 35 between the bolster pin and the traction beam, it being understood that the height $h$ of the abutting surface 35 is determined as before.

Figure 6:
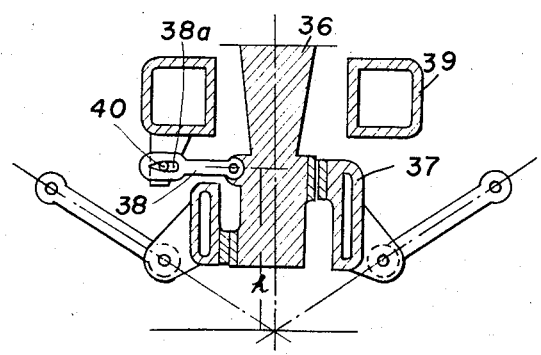
FIG. 6 shows another modification similar to FIG. 5(A)

In the modification shown in FIG. 6, a link 38, similar to the link 31 of FIG. 5, is pivotally connected on the upper inner side of a bolster pin 36 which cooperates with a tiltable traction beam 37, at a height $h$ above the surface if the rail. An elongated slot 38a at the other end of the link 38 slidably receives a pin 40 provided for a transverse beam 39 of a truck. Again with this truck, the link 38 will not operate when the truck is operating as a leading truck or travelling to the right as viewed in the drawing so that the truck will act to prevent shift of axle weight, whereas when the truck is operating as a trailing truck or travelling to the left, the traction beam 37 will be rotated in the clockwise direction so as to transmit the tractive force through the pin 40 and the link 38 similarly as shown in FIG. 5(B). In this case the effective height of the bolster pin, or the height of the effective point of transmitting the tractive force is equal to $h$, whereby enabling to equalize the weights acting upon each of the axles of the leading truck and the bore axle of the trailing trucks.

In a still further modification shown in FIGS. 7A and 7B, an additional abutting surface 45 is provided for a bolster pin 41 which is arranged to cooperate with the tiltable traction beam 42, in a manner similar to that described in connection with the first embodiment. An abutting surface 45' is provided on the inner side of a transverse beam 44 to cooperate with the abutting surface 45. Again, in this embodiment when the truck is operating as a leading truck as shown in FIG. 7A, the center lines of the bolster pin 41 and of the traction beam 42 coincide so as to bring the point of crossing between the center lines of the suspending links 43 and 43' on the upper surface of the rail whereby the truck will operate to prevent shift of axle weight. On the other hand when the truck is operating as a trailing truck as shown in FIG. 7B, the traction beam 42 will be tilted in the clockwise direction to move the point of crossing between the center lines of the suspending links away from the surface of the rail and cause the abutting surface 45' to abut against the abutting surface 45. Accordingly the tractive force will be transmitted through these abutting surfaces, the height $h$ thereof constituting the effective height of the bolster pin. As before, by suitably selecting this height it is able to make equal the weight acting upon the fore axle of the trailing truck to that upon each of the axles of the leading truck.

FIGS. 8 and 9 show still further modifications of this invention wherein the height of an effective point of transmitting the tractive force is varied depending upon the direction of travelling of a truck by means different from those shown in the previous embodiments. More particularly, in FIG. 8, a spherical or cylindrical journal surface 50 having a center of its curvature on the surface of a rail 51 is provided on the upper surface of a traction beam 52 pivotally suspended from side frames 6 of a truck 4 by means of suspending links 53 and 54. On the lower end of a bolster pin 2 depending from the car body 1 is provided a cooperating journal surface 55, the right half (or outer half) thereof having the same curvature as the surface 50 while the left half (or inner half) 56 being horizontal or tangential to the surfaces 50 and 55. An abutting surface 57 is provided on the outer side surface of the bolster pin 2 to cooperate with a similar abutting surface 58 on the inner side of a beam 59 depending from the side frame 6 of the truck. As before, these abutting surfaces are provided at a height $h$ above the surface of the rail 51 as determined by the equation given above.

In operation, when the truck is operating as a leading truck or travelling in a direction indicated by an arrow B the bolster pin 2 and the traction beam engage each other at their spherical surfaces 50 and 55 so that the effective point of transmitting the tractive force is on the surface of the rail 51, whereby the truck operates to prevent shift of axle weights. On the other hand when the truck is operating as a trailing truck or travelling in the direction indicated by an arrow B the spherical surface 50 engages the horizontal surface 56 of the bolster pin and the abutting surfaces 57 and 58 engage each other to transmit the tractive force at this point.

In the arrangement shown in FIG. 8, the height $$h = \frac{2Hl}{L+l}$$

of the abutting surfaces 57 and 58 above the surface of the rail is selected to be larger than the distance between the lower surface of the bolster pin and the upper surface of the rail. If, however, it is desired to make the height $h$ smaller than said distance between the bolster pin and the rail when the truck is operating as a trailing truck, it is preferable to substitute a curved surface 56', FIG. 9, for the horizontal surface 56, FIG. 8. This curved surface 56' comprises a spherical or cylindrical section having the center of its curvature at a point C which is located above the surface of the rail by a distance $h'$, and a horizontal section 60 connecting this curved section to the spherical surface 55 having its center of curvature on the surface of the rail 51.

The truck shown in FIG. 9 operates in the same manner as that shown in FIG. 8 when it is operating as a leading truck but when it is operating as a trailing truck spherical surface 50' having its center C' of curvature engages the spherical section 56' so that the effective point of transmitting the tractive force will be moved to a point of height $h'$ above the surface of the rail whereby the truck will act as a low bolster truck.

It is to be understood that various specific embodiments disclosed are merely illustrative of the general principles of the invention and that various changes and modifications may be made without departing from the true spirit and scope of the invention as defined in the appended claims.

What is claimed is:

1. A railway truck car body assembly which acts as a truck having means to prevent shift of axle weight when it is travelling in one direction and acts as a truck having a low bolster when it is travelling in the opposite direction, comprising a truck frame, a car body, a bolster pin depending from said car body through said truck frame, a traction beam pivotally supported by said truck frame to cooperate with said bolster pin in tractive force transmitting relation, said traction beam being pivotally suspended from the truck frame by means of a pair of converging links having their axes normally crossing each other at a point located on the surface of the rails upon which said car body is adapted to travel, and contact means on said traction beam and on said bolster pin so constructed as to cooperate such that when the truck is travelling in one direction, the effective point of transmitting the tractive force between the truck frame and car body is substantially on the surface of the rails on which said truck is running, whereas when said truck is travelling in the opposite direction, said point is shifted to a location which is at a higher vertical level than the surface of said rails, said contact means comprising an abutting surface on the upper outer side and another abutting surface on the lower inner side of said bolster pin, said traction beam being provided with an upper and lower abutting surface each adapted to cooperate with the corresponding abutting surfaces of said bolster pin, said upper and lower abutting surfaces of each of said bolster pin and traction beam being vertically spaced from each other.

2. The railway truck according to claim 1 wherein said traction beam is connected to said truck frame through a link including a lost motion connection.

3. The railway truck according to claim 1 wherein said bolster pin is provided with a third abutting surface adapted to engage an abutting surface provided for said truck frame.

References Cited

UNITED STATES PATENTS

| | | | |
|---|---|---|---|
| 665,382 | 1/1901 | Carnahan | 105—199 |
| 978,424 | 12/1910 | Anderson | 105—200 |
| 1,202,808 | 10/1916 | Corsti | 105—44 |
| 1,829,464 | 10/1931 | Wheeler | 105—199 |
| 2,258,663 | 10/1941 | Travilla et al. | 105—224.1 |
| 2,268,267 | 12/1941 | Sheesley | 105—171 |
| 2,492,337 | 12/1949 | Travilla | 105—193 |
| 2,530,495 | 11/1950 | Waldvogel | 105—199 |
| 2,836,130 | 5/1958 | Rossell | 105—224 |

FOREIGN PATENTS

| | | |
|---|---|---|
| 1,162,388 | 4/1958 | France. |
| 1,201,676 | 7/1959 | France. |
| 1,296,933 | 5/1962 | France. |
| 805,890 | 5/1951 | Germany. |
| 171,740 | 6/1960 | Sweden. |

ARTHUR L. LA POINT, *Primary Examiner.*

H. BELTRAN, *Assistant Examiner.*